United States Patent
Hsieh et al.

(10) Patent No.: US 9,513,728 B2
(45) Date of Patent: Dec. 6, 2016

(54) TOUCH SENSOR APPLIED ON LARGE SIZE DISPLAY

(71) Applicant: E Ink Holdings Inc., Hsinchu (TW)

(72) Inventors: Yun-Nan Hsieh, Hsinchu (TW); Lin-An Chen, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 102 days.

(21) Appl. No.: 13/936,212

(22) Filed: Jul. 8, 2013

(65) Prior Publication Data

US 2014/0104204 A1    Apr. 17, 2014

(30) Foreign Application Priority Data

Oct. 11, 2012    (TW) ............................... 101137489 A (51) Int. Cl.
  *G06F 3/041*    (2006.01)
  *G06F 3/044*    (2006.01)

(52) U.S. Cl.
  CPC ............... *G06F 3/041* (2013.01); *G06F 3/044* (2013.01); *G06F 3/0416* (2013.01)

(58) Field of Classification Search
  CPC ......... G06F 3/044; G06F 3/0416; G06F 3/041
  USPC ....................................................... 345/173
  See application file for complete search history.

(56) References Cited

U.S. PATENT DOCUMENTS

| | | | | |
|---|---|---|---|---|
| 5,493,723 A * | 2/1996 | Beck et al. | ...................... | 703/28 |
| 5,650,597 A | 7/1997 | Redmayne | | |
| 6,297,811 B1 * | 10/2001 | Kent | ...................... | G06F 3/044 |
| | | | | 178/18.01 |
| 2004/0257786 A1* | 12/2004 | Murasawa | ..................... | 361/810 |
| 2007/0074914 A1* | 4/2007 | Geaghan et al. | .......... | 178/18.06 |
| 2008/0259044 A1* | 10/2008 | Utsunomiya | .......... | G06F 3/044 |
| | | | | 345/173 |
| 2009/0109181 A1* | 4/2009 | Hui et al. | ...................... | 345/173 |
| 2010/0214247 A1* | 8/2010 | Tang et al. | .................... | 345/173 |
| 2010/0325630 A1* | 12/2010 | Flood et al. | ................... | 718/101 |
| 2011/0141040 A1* | 6/2011 | Kang et al. | ................... | 345/173 |
| 2011/0304570 A1* | 12/2011 | Maeda et al. | ................. | 345/173 |
| 2012/0229416 A1 | 9/2012 | Ku et al. | | |

FOREIGN PATENT DOCUMENTS

| | | | |
|---|---|---|---|
| CN | 102027438 A | 4/2011 |
| CN | 102096499 A | 6/2011 |
| CN | 102207781 A | 10/2011 |
| CN | 102707823 A | 10/2012 |

(Continued)

*Primary Examiner* — Andrew Sasinowski
*Assistant Examiner* — Chun-Nan Lin
(74) *Attorney, Agent, or Firm* — CKC & Partners Co., Ltd.

(57) ABSTRACT

A touch sensor includes a substrate, a touch sensing layer, a first processor and a second processor. The substrate includes a first area and a second area. The first area and the second area are on the same surface of the substrate. The touch sensing layer is disposed on the substrate, and includes a first group of conductive patterns and a second group of conductive patterns. The first group of conductive patterns is disposed on the first area, and includes a plurality of first conductive patterns. The second group of conductive patterns is disposed on the second area, and includes a plurality of second conductive patterns. The first processor is electrically connected to the first conductive patterns. The second processor is electrically connected to the second conductive patterns.

9 Claims, 5 Drawing Sheets

(56) References Cited

FOREIGN PATENT DOCUMENTS

| | | |
|---|---|---|
| TW | 200805128 A | 1/2008 |
| TW | 200921485 A | 5/2009 |
| TW | M368848 | 11/2009 |
| TW | 201220154 A | 5/2012 |

\* cited by examiner

TOUCH SENSOR APPLIED ON LARGE SIZE DISPLAY

RELATED APPLICATIONS

This application claims priority to Taiwanese Application Serial Number 10117489, filed Oct. 11, 2012, which is herein incorporated by reference.

BACKGROUND

1. Technical Field

Embodiments of the present invention relate to a sensor device. More particularly, embodiments of the present invention relate to a touch sensor.

2. Description of Related Art

With the development of technology, the touch panel has been widely applied in the display, such as the display of a tablet or a smart phone. By integrating the touch panel into the display, a user can directly enter commands by using a finger or a touch pen to touch the touch panel, and this operation method is more convenient than the operational method by using a traditional keypad.

Generally, the touch panel is classified as a resistive touch panel, a capacitive touch panel, an optical touch panel, a sound wave touch panel, and so on. The capacitive touch panel utilizes the current induced by the capacitance variation, because of the capacitance varied with the static electricity between the human body and the transparent electrode, to locate the touch point of the human body. In that both the accuracy and the response time of the capacitive touch panel are superior to which of other touch panels, the capacitive touch panel has been widely used in the manufactures of the display.

In view of layer-stacking ways, the capacitive touch panel can be classified as a DITO (double ITO) panel and a SITO (single ITO) panel. The DITO panel includes two ITO layers respectively formed on opposite surfaces of the substrate, while the SITO only includes an ITO layer disposed on one surface of the substrate. The SITO panel incurs lower cost in material and manufacture and uses less expensive integrated circuit (IC) compared to that of the DITO panel. However, since there is a limit in the number of pins for the ICs used in the SITO, the ICs cannot be applied to a large size display.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

A touch sensor with low cost and capable of being applied on a large size display is provided. In accordance with one embodiment of the present invention, a touch sensor includes a substrate, a touch sensing layer, a first processor, and a second processor. The substrate includes a first area and a second area on the same surface of the substrate. The touch sensing layer is disposed on the substrate, and it includes a first group of conductive patterns and a second group of conductive patterns. The first group of conductive patterns is disposed on the first area of the substrate, and includes a plurality of first conductive patterns. The second group of conductive patterns is disposed on the second area of the substrate, and includes a plurality of second conductive patterns. The first processor is electrically connected to the first conductive patterns. The second processor is electrically connected to the second conductive patterns.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

Figure 1:
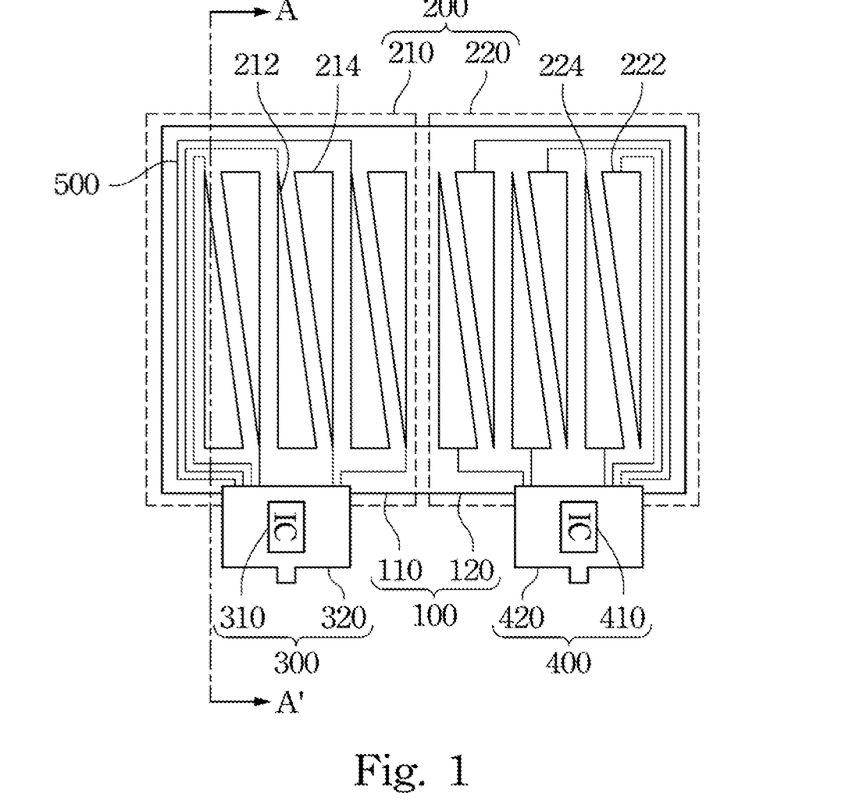
FIG. 1 is a top view of a touch sensor in accordance with one embodiment of the present invention.
Figure 2:
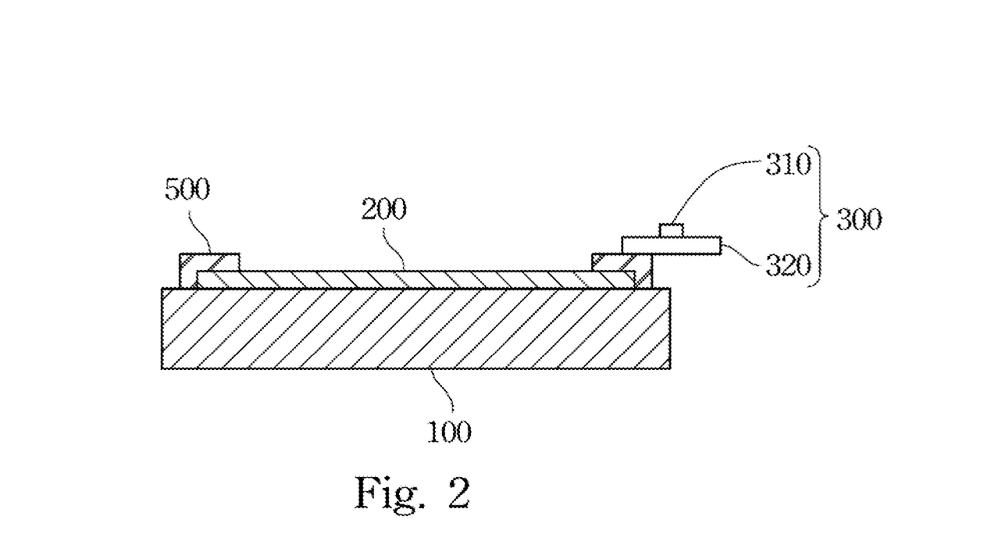
FIG. 2 is a cross-sectional view of the touch sensor along A-A' ling in FIG. 1.

FIG. 1 is a top view of a touch sensor in accordance with one embodiment of the present invention. FIG. 2 is a cross-sectional view of the touch sensor along A-A' ling in FIG. 1. As shown in FIG. 1 and FIG. 2, a touch sensor includes a substrate 100, a touch sensing layer 200, a first processor 300, and a second processor 400. The substrate 100 includes a first area 110 and a second area 120 on the same surface of the substrate 100. The touch sensing layer 200 is disposed on the substrate 100, and it includes a first group of conductive patterns 210 and a second group of conductive patterns 220. The first group of conductive patterns 210 is disposed on the first area 110 of the substrate 100, and includes a plurality of first conductive patterns 212, 214. The second group of conductive patterns 220 is disposed on the second area 120 of the substrate 100, and includes a plurality of second conductive patterns 222, 224. The first processor 300 is electrically connected to the first conductive patterns 212, 214. The second processor 400 is electrically connected to the second conductive patterns 222, 224.

In some embodiments, event though the total number of the first conductive patterns 212, 214 plus the second conductive patterns 222, 224 is greater than the number of pins of any processor, such as the first processor 300 or the second processor 400, the pins are still sufficient because the first processor 300 is only required to electrically connect the first conductive patterns 212, 214, rather than connecting all conductive patterns in the touch sensing layer 200, and the second processor 400 is only required to electrically connect the second conductive patterns 222, 224, rather than connecting all conductive patterns in the touch sensing layer 200.

In other words, on a single substrate, although the number of pins of the first processor 300 and the number of pins of the second processor 400 are both less than the total number of the first conductive patterns 212, 214 plus the second conductive patterns 222, 224, as long as the number of pins of the first processor 300 is greater than or equal to the number of the first conductive patterns 212, 214, and the number of pins of the second processor 400 is greater than or equal to the number of the second conductive patterns 222, 224, the first processor 300 and the second processor 400 can still used to detect the touch by the user.

In some embodiments, the touch sensor can be applied on a display with size larger than 7 inches. In other words, the area occupied by the substrate 100 and the touch sensing layer 200 is greater than 7 inches. In order to uniformly distribute the first group of conductive patterns 210 and the second group of conductive patterns 220 on an area greater than 7 inches, the total number of the first conductive patterns 212, 214 plus the second conductive patterns 222, 224 is a natural number greater than 45.

In some embodiments, the number of pins of the first processor 300 is M, and the number of pins of the second processor 400 is N. M and N are both the natural number less than 40. Although M and N are both less than 40, as long as the summation of M plus N is greater than 45, the touch sensor can still applied on the display with size larger than 7 inches. In some embodiments, M is equal to N. In some embodiments, M is not equal to N.

In some embodiments, the first processor 300 and the second processor 400 are spatially separated and disposed on the same side. The first processor 300 includes a first circuit board 320 and a first integrated circuit 310. The second processor 400 includes a second circuit board 420 and a second integrated circuit 410. The first integrated circuit 310 is disposed on the first circuit board 320. The second integrated circuit 410 is disposed on the second circuit board 420. The first integrated circuit 310 and the second integrated circuit 410 are spatially separated. In other words, the first integrated circuit 310 and the second integrated circuit 410 are two separated and independent pieces. The first circuit board 320 and the second circuit board 420 are spatially separated and disposed on the same side of the substrate 100. In some embodiments, the first circuit board 320 and the second circuit board 420 can be, but are not limited to be, a FPC (flexible printed circuit).

The number of pins of the first integrated circuit 310 is the number of pins of the first processor 300, and the number of pins of the second integrated circuit 410 is the number of pins of the second processor 400. In other words, even though the number of pins of the first integrated circuit 310 and the number of pins of the second integrated circuit 410 are both less than the total number of the first conductive patterns 212, 214 plus the second conductive patterns 222, 224, as long as the number of pins of the first integrated circuit 310 is greater than or equal to the number of the first conductive patterns 212, 214, and the number of pins of the second integrated circuit 410 is greater than or equal to the number of the second conductive patterns 222, 224, the first integrated circuit 310 and the second integrated circuit 410 can still used to detect the touch by the user.

The first conductive patterns 212, 214 are electrically connected to the first integrated circuit 310 via the first circuit board 320. The first integrated circuit 310 can determine the touch location on the first area 110 of the substrate 100 based on the capacitance variance of the first conductive patterns 212, 214. Similarly, the second conductive patterns 222, 224 are electrically connected to the second integrated circuit 410 via the second circuit board 420. The second integrated circuit 410 can determine the touch location on the second area 120 of the substrate 100 based on the capacitance variance of the second conductive patterns 222, 224.

In some embodiments, the touch sensor further includes a circuit layer 500 disposed on the substrate 100 for electrically connect the touch sensing layer 200 to the first processor 300 and the second processor 400. The circuit layer 500 includes a plurality of conductive lines therein, as shown in FIG. 3 and FIG. 4.

Figure 3:
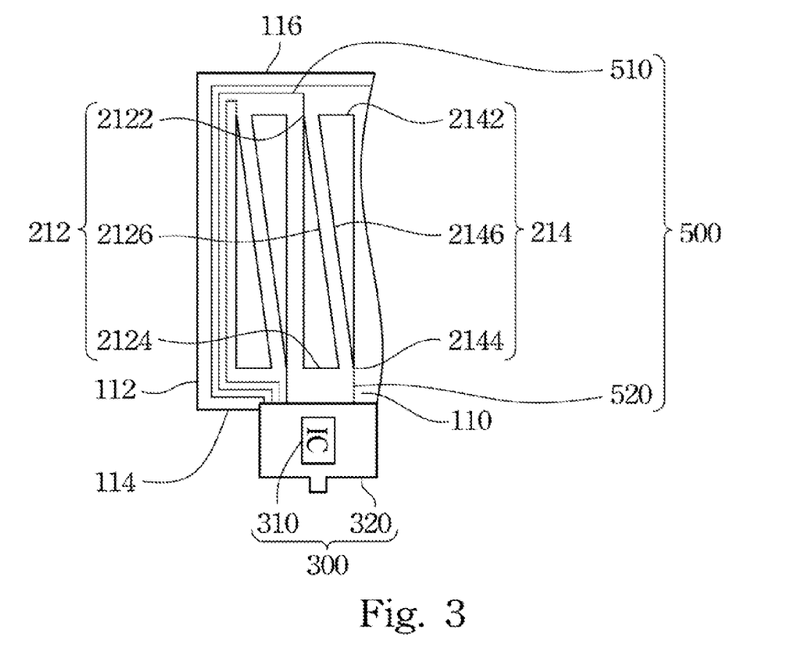
FIG. 3 is a partially top view of the touch sensor in FIG. 1.
Figure 4:
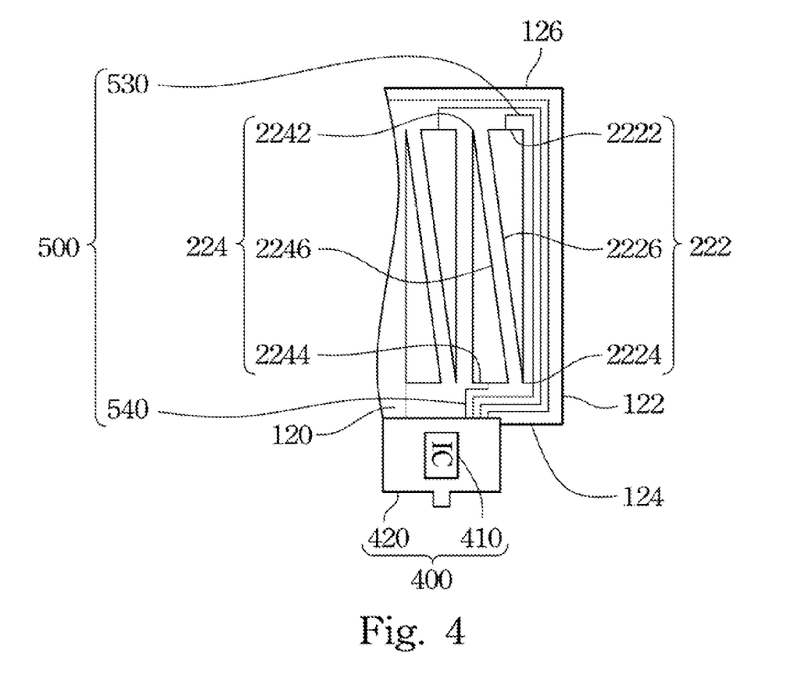
FIG. 4 is another partially top view of the touch sensor in FIG. 1.

FIG. 3 is a partially top view of the touch sensor in FIG. 1. As shown in FIG. 3, the circuit layer 500 includes a plurality of first conductive lines 510 and a plurality of second conductive lines 520. Each of the first conductive patterns 212 includes a first end 2122 and a second end 2124 opposite to the first end 2122. Each of the first conductive patterns 214 includes a first end 2142 and a second end 2144 opposite to the first end 2142. The second ends 2124, 2144 are closer to the first processor 300 than the first ends 2122, 2142. The first conductive lines 510 are respectively connected between the first ends 2122 of the first conductive patterns 212 and the first processor 300. The second conductive lines 520 are respectively connected between the second ends 2144 of the first conductive patterns 214 and the first processor 300.

Specifically, the first end 2122 of the first conductive pattern 212 is farer away from the first processor 300, and the second end 2124 is closer to the first processor 300. The first conductive line 510 extends from the first end 2122 of the first conductive pattern 212 on the top rim 116 toward the left rim 112, and is banded along the left rim 112 and extends toward the bottom rim 114, and is banded along the bottom rim 114 and connected to the first processor 300.

In other words, the first conductive line 510 is bended along the top rim 116, the left rim 112 and the bottom rim 114 of the first area 110 and connected to the first processor 300. If employing a first conductive line 510 with fixed length, because the top rim 116 and the left rim 112 of the first area 110 can both used to place part of the first conductive line 510, it is not necessary to reserve too much space in the bottom rim 114 of the first area 110 for placing the whole first conductive line 510, thereby reducing the size of the bottom rim 114 of the first area 110.

Further, the first end 2142 of the first conductive pattern 214 is farer away from the first processor 300, and the second end 2144 thereof is closer to the first processor 300. In other words, the second end 2144 is immediately adjacent to the bottom rim 114 of the first area 110. The second conductive line 520 is directly connected from the second end 2144 of the first conductive pattern 214, immediately adjacent to the bottom rim 114, to the first processor 300 without being bended.

In some embodiments, the first conductive pattern 212 and the first conductive pattern 214 are adjacent, and they are respectively connected to the first conductive line 510 and the second conductive line 520. In other words, a first conductive pattern 212 is disposed between two first conductive patterns 214, and it utilizes the first end 2122 farer away from the first processor 300 to connect the first conductive line 510. The first conductive pattern 214 is disposed between two first conductive patterns 212, and it utilizes the second end 2144 closer to the first processor 300 to connect the second conductive line 520. Referring to FIG. 1, it can be observed that, in the first group of conductive patterns 210 along the direction crossing the first conductive patterns 212 and 214, one conductive line is extended from the upper end of one pattern and another conductive line is extended from the lower end of another pattern.

In some embodiments, the adjacent first conductive patterns 212 and 214 are complementary triangles. For example, the first end 2122 of the first conductive pattern 212 is a vertex of a triangle, and the second end 2124 is an edge corresponding to the first end 2122. Further, the first conductive pattern 212 includes a hypotenuse 2126 connecting between the first end 2122 and the second end 2124 to constitute the triangle. Further, the first end 2142 of the first conductive pattern 214 is an edge of a triangle, and the second end 2144 is a vertex corresponding to the first end 2142. Further, the first conductive pattern 214 includes a hypotenuse 2146 connecting between the first end 2142 and the second end 2144 to constitute the triangle. The hypotenuse 2146 and the hypotenuse 2126 are parallel to make the first conductive pattern 212 and 214 complementary to each other.

It is noted that, the first conductive patterns 212 and 214 are drawn as a right triangle. But in practice, the first conductive patterns 212 and 214 can be any triangle, while is not limited to be the right triangle. In other embodiments, the first conductive patterns 212 and 214 can be, but is not limited to be, any shape such as, for example, rectangle, circle, ellipse, rhomboid, and so on.

FIG. 4 is another partially top view of the touch sensor in FIG. 1. As shown in FIG. 4, the circuit layer 500 includes a plurality of third conductive lines 530 and a plurality of fourth conductive lines 540. Each of the second conductive patterns 222 includes a first end 2222 and a second end 2224 opposite to the first end 2222. Each of the second conductive patterns 224 includes a first end 2242 and a second end 2244 opposite to the first end 2242. The second ends 2224, 2244 are closer to the second processor 400 than the first ends 2222, 2242. The third conductive lines 530 are respectively connected between the first ends 2222 of the second conductive patterns 222 and the second processor 400. The fourth conductive lines 540 are respectively connected between the second ends 2244 of the second conductive patterns 224 and the second processor 400.

Specifically, the first end 2222 of the second conductive pattern 222 is farer away from the second processor 400, and the second end 2224 is closer to the second processor 400. The third conductive line 530 extends from the first end 2222 of the second conductive pattern 222 on the top rim 126 toward the right rim 122, and is bended along the right rim 122 and extends toward the bottom rim 124, and is bended along the bottom rim 124 and connected to the second processor 400.

In other words, the third conductive line 530 is bended along the top rim 126, the right rim 122 and the bottom rim 124 and connected to the second processor 400. If employing a third conductive line 530 with fixed length, because the top rim 126 and the right rim 122 of the second area 120 can both used to place part of the third conductive line 530, it is not necessary to reserve too much space in the bottom rim 124 of the second area 120 for placing the whole third conductive line 530, thereby reducing the size of the bottom rim 124 of the second area 120.

Further, the first end 2242 of the second conductive pattern 224 is farer away from the second processor 400, and the second end 2244 thereof is closer to the second processor 400. In other words, the second end 2244 is immediately adjacent to the bottom rim 124 of the second area 120. The fourth conductive line 540 is directly connected from the second end 2244 of the second conductive pattern 224, immediately adjacent to the bottom rim 124, to the second processor 400 without being bended.

In some embodiments, the second conductive pattern 222 and the second conductive pattern 224 are adjacent, and they are respectively) connected to the third conductive line 530 and the fourth conductive line 540. In other words, a second conductive pattern 222 is disposed between two second conductive patterns 224, and it utilizes the first end 2222 farer away from the second processor 400 to connect the third conductive line 530. The second conductive pattern 224 is disposed between two second conductive patterns 222, and it utilizes the second end 2244 closer to the second processor 400 to connect the fourth conductive line 540. Referring to FIG. 1, it can be observed that, in the second group of conductive patterns 220 along the direction crossing the second conductive patterns 222 and 224, one conductive line is extended from the upper end of one pattern and another conductive line is extended from the lower end of another pattern.

In some embodiments, the adjacent second conductive patterns 222 and 224 are complementary triangles. For example, the first end 2222 of the second conductive pattern 222 is an edge of a triangle, and the second end 2224 is a vertex corresponding to the first end 2222. Further, the second conductive pattern 222 includes a hypotenuse 2226 connecting between the first end 2222 and the second end 2224 to constitute the triangle. Further, the first end 2242 of the second conductive pattern 224 is a vertex of a triangle, and the second end 2244 is an edge corresponding to the first end 2242. Further, the second conductive pattern 224 includes a hypotenuse 2246 connecting between the first end 2242 and the second end 2244 to constitute the triangle. The hypotenuse 2246 and the hypotenuse 2226 are parallel to make the second conductive pattern 222 and 224 complementary to each other.

It is noted that, the second conductive patterns 222 and 224 shown in FIG. 4 are drawn as a right triangle. But in practice, the second conductive patterns 222 and 224 can be any triangle, while is not limited to be the right triangle. In other embodiments, the second conductive patterns 222 and 224 can be, but is not limited to be, any shape such as, for example, rectangle, circle, ellipse, rhomboid, and so on.

Figure 5:
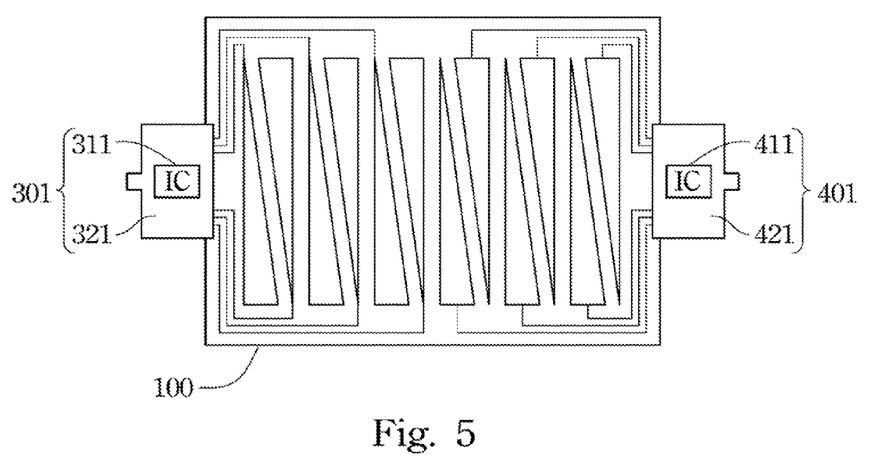
FIG. 5 is a top view of the touch sensor in accordance with another embodiment of the present invention.

FIG. 5 is a top view of the touch sensor in accordance with another embodiment of the present invention. The main difference between this embodiment and FIG. 1 is that the positions of the first processor 301 and the second processor 401 are different from the positions of the first processor 300 and the second processor 400. In this embodiment, the first processor 301 and the second processor 401 are disposed on opposite sides of the substrate 100, not the same side. In this embodiment, the first processor 301 and the second processor 401 are disposed on two shorter sides of the substrate 100.

The first processor 301 includes a first circuit board 321 and a first integrated circuit 311. The second processor 401 includes a second circuit board 421 and a second integrated circuit 411. The first integrated circuit 311 is disposed on the first circuit board 321. The second integrated circuit 411 is disposed on the second circuit board 421. The first circuit board 321 and the second circuit board 421 are disposed on the opposite shorter sides of the substrate 100. In some embodiments, the first circuit board 321 and the second circuit board 421 can be, but are not limited to be, a FPC (flexible printed circuit).

Figure 6:
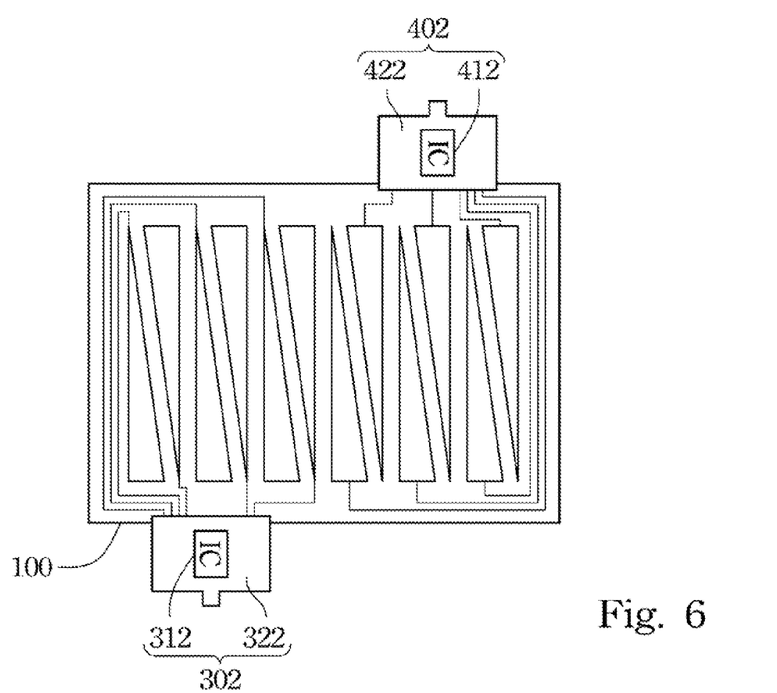
FIG. 6 is a top view of the touch sensor in accordance with another embodiment of the present invention.

FIG. 6 is a top view of the touch sensor in accordance with another embodiment of the present invention. The main difference between this embodiment and FIG. 5 is that the positions of the first processor 302 and the second processor 402 are different from the positions of the first processor 301 and the second processor 401. In this embodiment, the first processor 302 and the second processor 402 are disposed on two longer sides of the substrate 100, not on the shorter sides.

The first processor 302 includes a first circuit board 322 and a first integrated circuit 312. The second processor 402 includes a second circuit board 422 and a second integrated circuit 412. The first integrated circuit 312 is disposed on the first circuit board 322. The second integrated circuit 412 is disposed on the second circuit board 422. The first circuit board 322 and the second circuit board 422 are disposed on the opposite longer sides of the substrate 100. In some embodiments, the first circuit board 322 and the second circuit board 422 can be, but are not limited to be, a FPC (flexible printed circuit).

Figure 7:
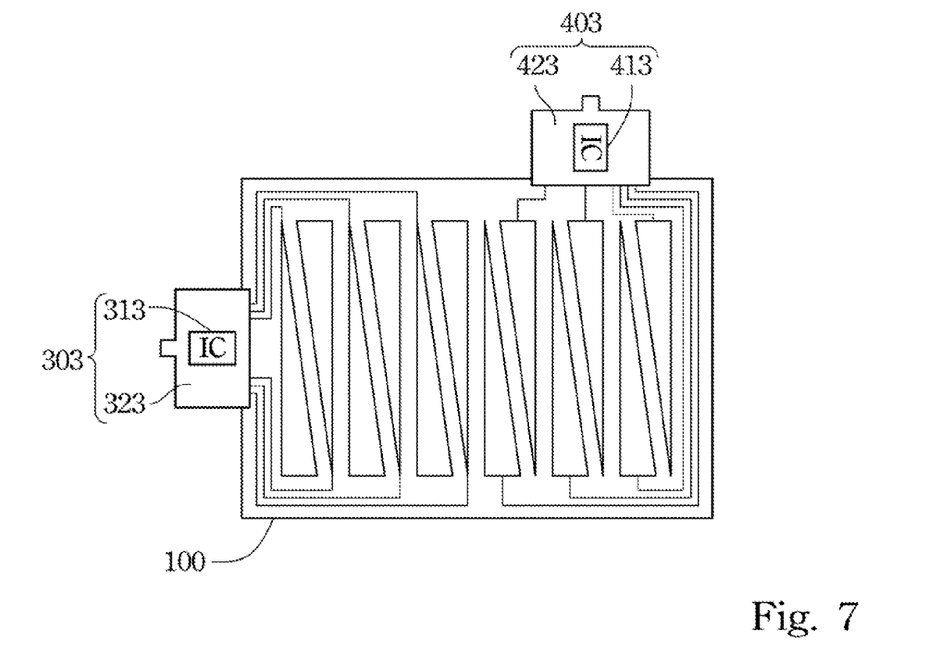
FIG. 7 is a top view of the touch sensor in accordance with another embodiment of the present invention.

FIG. 7 is a top view of the touch sensor in accordance with another embodiment of the present invention. The main difference between this embodiment and FIG. 6 is that the positions of the first processor 303 and the second processor 403 are different from the positions of the first processor 302 and the second processor 402. In this embodiment, the first processor 303 and the second processor 403 are disposed on two adjacent sides of the substrate 100, not on the opposite sides.

The first processor 303 includes a first circuit board 323 and a first integrated circuit 313. The second processor 403 includes a second circuit board 423 and a second integrated circuit 413. The first integrated circuit 313 is disposed on the first circuit board 323. The second integrated circuit 413 is disposed on the second circuit board 423. The first circuit board 323 and the second circuit board 423 are respectively disposed on a shorter side and a longer side of the substrate 100. This shorter side is adjacent to the longer side. In some embodiments, the first circuit board 323 and the second circuit board 423 can be, but are not limited to be, a FPC (flexible printed circuit).

Figure 8:
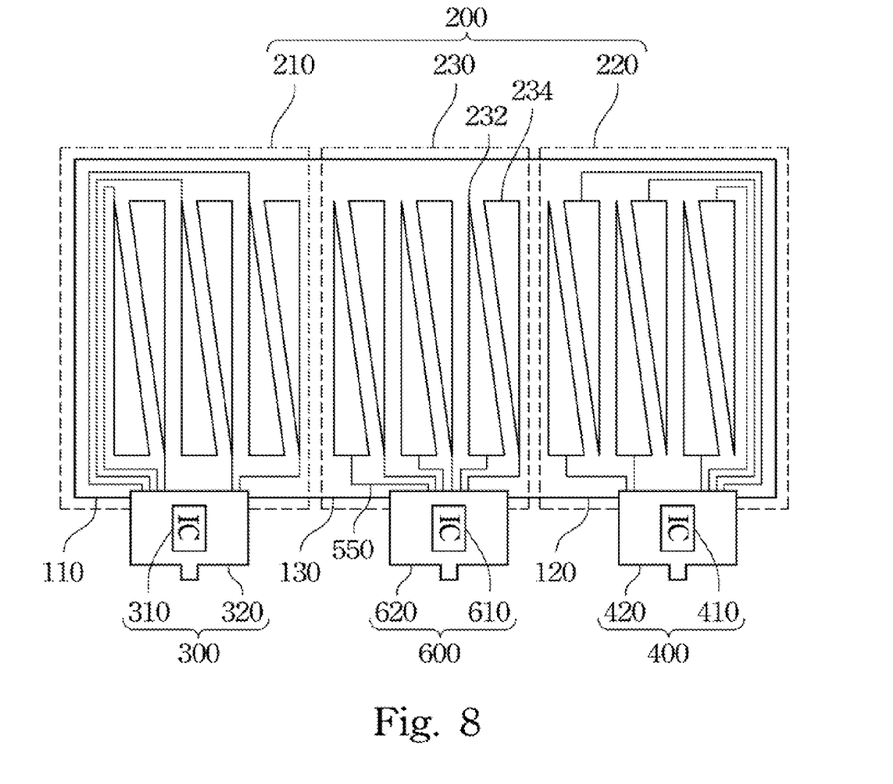
FIG. 8 is a top view of the touch sensor in accordance with another embodiment of the present invention.

FIG. 8 is a top view of the touch sensor in accordance with another embodiment of the present invention. The main difference between this embodiment and FIG. 1 is that the touch sensor in this embodiment further includes at least one third processor 600. The substrate 100 further includes at least one third area 130 between the first area 110 and the second area 120. The touch sensing layer 200 further includes at least one third group of conductive patterns 230 disposed on the third area 130, and the third group of conductive patterns 230 includes a plurality of third conductive patterns 232, 234 electrically connected to the third processor 600.

By the embodiment of FIG. 8, even though the size of the display is too large and the total pins of the first processor 300 and the second processor 400 are not sufficient, the third processor 600 can be used to connect the third to group of conductive patterns 230 on the third area 130. In some embodiments, the number of the third processor 600 can be plural, depending on the size of the display and the number of the pins of the first processor 300, the second processor 400, and the third processor 600.

In some embodiments, the first processor 300, the second processor 400, and the third processor 600 are all disposed on the same side of the substrate 100. The third processor 600 includes a third circuit board 620 and a third integrated circuit 610. The number of the pins of the third integrated circuit 610 is the number of the pins of the third processor 600. The third integrated circuit 610 is disposed on the third circuit board 620. The third circuit board 620, the first circuit board 320 and the second circuit board 420 are disposed on the same side of the substrate 100. In some embodiments, the third circuit board 620 can be, but is not limited to be, a FPC.

In some embodiments, the third processor 600 utilizes a plurality of fifth conductive lines 550 to electrically connect to the third conductive patterns 232, 234. The adjacent third conductive patterns 232, 234 are complementary triangles. It is noted that the third conductive patterns 232 and 234 can be, but is not limited to be, any shape such as, for example, rectangle, circle, ellipse, rhomboid, and so on.

Figure 9:
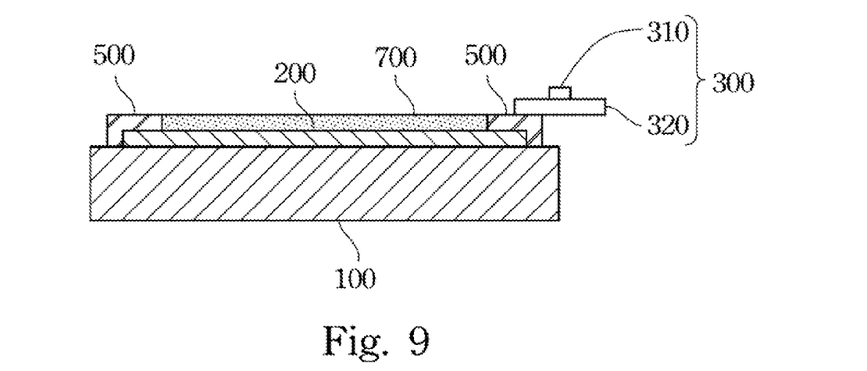
FIG. 9 is a cross-sectional view of the touch sensor in accordance with another embodiment of the present invention.

FIG. 9 is a cross-sectional view of the touch sensor in accordance with another embodiment of the present invention. The main difference between this embodiment and FIG. 1 is that the touch sensor in this embodiment further includes a protective layer 700 covering the touch sensing layer 200. The protective layer 700 can be used to protect the touch sensing layer 200 from the external forces or electric fields. For example, when the staff assembles the touch sensor on the display, the protective layer 700 can prevent the display from contacting the touch sensing layer 200. In some embodiments, the protective layer 700 can be formed by, for example, photoresist or $SiO_x$.

In aforementioned embodiments, the first conductive patterns 212, 214, the second conductive patterns 222, 224 and the third conductive patterns 232, 234 are formed by electrically conductive material. The electrically conductive material can be light transmissive, and it can be, but is not limited to be, ITO. The substrate 100 can be, but is not limited to be, glass.

The touch sensor provided in the aforementioned embodiments can be applied on the display of the smart phone, a LCD, a display of the notebook, a display of the tablet or other displays.

It is noted that, although the terms first, second, third, etc, may be used herein to describe various elements, these elements should not be limited by these terms. These terms are only used to distinguish one element from another. For example, a first conductive pattern could be termed a second conductive pattern, and, similarly, a second conductive pattern could be termed a first conductive pattern, without departing from the scope of the present disclosure.

It is also noted that the description "the feature A is disposed on the feature B" in this specification not only refers to the embodiment that the feature A directly contacts the feature B, but also refers to the embodiment that an additional feature C is disposed between the feature A and the feature B.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A touch sensor, comprising:
a substrate comprising a first area and a second area on the same surface of the substrate;
a touch sensing layer disposed on the substrate, comprising:
a plurality of first conductive patterns disposed on the first area of the substrate; and
a plurality of second conductive patterns disposed on the second area of the substrate;
a first processor electrically connected to the first conductive patterns;
a second processor electrically connected to the second conductive patterns;
a plurality of first conductive lines; and
a plurality of second conductive lines, wherein two of the first conductive patterns are formed in shapes of immediately adjacent triangular patterns complementary for a quadrilateral, and the immediately adjacent triangular patterns have opposite vertexes and longest sides substantially parallel and immediately adjacent to each other, wherein the first and second conductive lines respectively extend from the opposite vertexes of the immediately adjacent triangular patterns to the first processor.

2. The touch sensor of claim 1, wherein the number of pins of the first processor and the number of pins of the second processor are both less than the total number of the first conductive patterns plus the second conductive patterns.

3. The touch sensor of claim 2, wherein the number of the pins of the first processor and the number of the pins of the second processor are a natural number less than 40.

4. The touch sensor of claim 2, wherein the total number of the first conductive patterns plus the second conductive patterns is a natural number greater than 45.

5. The touch sensor of claim 1, wherein the first processor comprises a first circuit board and a first integrated circuit, and the first integrated circuit is disposed on the first circuit board; and
the second processor comprises a second circuit board and a second integrated circuit, and the second integrated circuit is disposed on the second circuit board, wherein the first integrated circuit and the second integrated circuit are spatially separated.

6. The touch sensor of claim 1, wherein the first processor and the second processor are disposed on the same side, adjacent sides, or opposite sides of the substrate.

7. The touch sensor of claim 1, further comprising:
at least one third processor;
wherein the substrate further comprises at least one third area between the first area and the second area and the touch sensing layer further comprises a plurality of third conductive patterns disposed on the third area, wherein the third conductive patterns are electrically connected to the third processor.

8. The touch sensor of claim 7, wherein the third processor comprises a third circuit board and a third integrated circuit, and the third integrated circuit is disposed on the third circuit board.

9. The touch sensor of claim 1, further comprising:
a protective layer covering the touch sensing layer.

* * * * *